(12) United States Patent
Fergason et al.

(10) Patent No.: US 6,554,428 B2
(45) Date of Patent: Apr. 29, 2003

(54) METHOD AND APPARATUS FOR ADJUSTING OPTICAL DEVICE TO CORRESPOND TO EYE POSITIONS

(75) Inventors: Jeffrey K. Fergason, Menlo Park, CA (US); John D. Fergason, Cupertino, CA (US)

(73) Assignee: i-O Display Systems LLC, Sacramento, CA (US)

( * ) Notice: Subject to any disclaimer, the term of this patent is extended or adjusted under 35 U.S.C. 154(b) by 38 days.

(21) Appl. No.: 09/948,257

(22) Filed: Sep. 7, 2001

(65) Prior Publication Data

US 2002/0047990 A1 Apr. 25, 2002

Related U.S. Application Data

(60) Provisional application No. 60/230,641, filed on Sep. 7, 2000.

(51) Int. Cl.[7] ................................................ A61B 3/10
(52) U.S. Cl. ........................ 351/211; 351/208; 348/115
(58) Field of Search ................................ 351/208, 209, 351/210, 211, 237, 239, 243, 246, 221; 345/7, 8, 9; 340/980; 348/115; 606/10; 600/558

(56) References Cited

U.S. PATENT DOCUMENTS

| | | | |
|---|---|---|---|
| 3,434,772 A | 3/1969 | Fogle | 350/35 |
| 3,914,012 A | 10/1975 | Boughton | 350/75 |
| 4,264,122 A | 4/1981 | Schmidt et al. | 350/36 |
| 4,347,508 A * | 8/1982 | Spooner | 345/8 |
| 5,502,519 A | 3/1996 | Hosoi | 351/204 |
| 5,571,108 A * | 11/1996 | Amano et al. | 606/10 |
| 5,988,815 A * | 11/1999 | Maus et al. | 351/221 |

* cited by examiner

Primary Examiner—George Manuel
(74) Attorney, Agent, or Firm—Sheridan Ross P.C.

(57) ABSTRACT

A head-mounted display or other optical device which provides at least a first image to at least one eye of a user can be adjusted for changing the alignment of an image path with respect to a user's eye position. An alignment beam generator is mounted so as to move with the image path device so a user can use characteristics of the alignment beam to achieve a desired alignment of the image path. Preferably, the alignment beam is configured, such as by making it substantially narrow-beam, linear and/or non-dispersive, such that beam is substantially invisible to the user until it is within a preferred alignment range, so as to provide a binary or visible/invisible, indicator of alignment.

28 Claims, 5 Drawing Sheets

METHOD AND APPARATUS FOR ADJUSTING OPTICAL DEVICE TO CORRESPOND TO EYE POSITIONS

This application claims the benefit of Provisional application Ser. No. 60/230,641, filed Sep. 7, 2000.

The present invention relates to a method and apparatus for adjusting components of an optical system to correspond to positions of a user's eyes and in particular to a system providing an optical signal to a user when adjustment is at least approximately correct.

BACKGROUND INFORMATION

Numerous optical devices are configured for outputting two different image paths, intended to be provided to a user's left and right eyes. Examples of such devices include head mounted displays (HMDs), helmet mounted displays, binoculars, binocular microscopes and the like. In many such devices, it desirable to have the two (final) image optical paths substantially aligned with the user's eye's, e.g., such that the center (or other reference point) of each image falls substantially on the center of the user's field of view. Departures from such a preferred alignment can have many undesirable consequences including loss of image quality, as perceived by the user, user eye strain or fatigue or, in extreme cases, potential for injury. Although some devices have included components intended to allow some amount of image position adjustment, previous approaches have generally been less than fully satisfactory.

In one approach, users are provided with an opportunity to provide a substantially symmetric adjustment of the lateral distance between the image paths. For example, some binoculars can be pivoted about a central hinge structure resulting in a change of the lateral distance between the two image paths. This approach, however, typically relies on a user's ability to recognize, based on viewing the images themselves with the left and right eyes, when proper adjustment has been achieved. Many users find it difficult to recognize correct alignment based merely on viewing the images with their eyes and the consequent misalignment can lead to poor image quality, eye strain or eye fatigue, and general dissatisfaction of users. Accordingly, it would be useful to provide a system which can provide for at least some alignment of first and second images with left and right eyes without requiring users to judge or recognize the quality or degree of alignment based only on viewing the images.

Additionally, an arrangement such as that found in hinged binoculars can result in users being substantially unable to determine or verify when an alignment has been achieved which is sufficiently accurate to avoid the above-described problems. Accordingly, previous systems can provide an adjustment which achieves an alignment which the users might (incorrectly) subjectively judge to be good enough, but which may, in fact, be (perhaps only slightly) outside the range of adjustment needed to avoid the above-described problems. Accordingly, it would be useful to provide an adjustment system which more readily allows users to verify that alignment is within predefined minimum alignment accuracy ranges, preferably by providing a standard or indicator of alignment which does not rely on subjective judgment of the user.

Furthermore, a system such as the common hinged binocular system is a symmetric system, i.e., providing for left and right images which are equally distant from a center line or center of mass of the binoculars. Users often have at least small departures from bilateral symmetry in their eye locations (and/or center of left and right fields of vision) and systems which provide only symmetric adjustment, with respect to the structure of the optical device as a whole, can contribute to misalignment of images with respect to one or both eyes, particularly when the optical device is coupled to the user's head, such as in a head-mounted display or a helmet-mounted display. Accordingly, it would be useful to provide a system which can, if desired, be implementing in a fashion permitting separate adjustment of left and right image positions and/or permitting asymmetric positioning of the images (with respect to, e.g., a center line or other fixed point on the optical device).

In addition to the common phenomenon of at least minor differences in the lateral position of user's left and right eyes, it is not uncommon to find at least minor differences in the vertical position (e.g., with respect to the posterior-anterior axis) of user's eyes. Misalignment of images in a vertical direction can also contribute to poor image quality, eye fatigue, eye strain and the like. Accordingly, it would be useful to provide an apparatus and method which can, if desired, be configured to allow the vertical position of the left and right images to be adjusted to respectively different vertical positions, preferably being adjustable separately (with respect to the optical device as a whole).

SUMMARY OF THE INVENTION

The present invention includes a recognition of the existence, nature and/or source of certain problems in previous approaches, including as described herein. In one aspect, the invention includes coupling a source of a relatively narrow-beam light to an image path device so that the narrow beam moves substantially with the image path as the image path is adjusted. Preferably, the device and method is configured so that users are provided with a substantially clearer indication of the alignment or relative alignment of the left and right images, with respect to the user's eyes. For example, in one embodiment, the left and right lights will be invisible to a user until the image path has been adjusted to within a pre-determined tolerance of preferred alignment. In this embodiment, the user receives a substantially binary alignment indication, i.e., with the presence of a visible indicator light being indicative of alignment (within tolerance of a preferred alignment) and with the absence or invisibility of the light being indicative of incorrect or improper alignment. Preferably, the device can be configured such that, after alignment has been achieved, the indicator light or lights can be disabled so as to avoid interfering with further image viewing. In one embodiment, a device for forming a narrow and/or substantially non-dispersive light beam is coupled on, or with respect to, one or both of the optics that form or deliver an image to the left and right eyes along an image path, such that, as the image path is moved or adjusted, the location where the narrow beam will enter the user's eye (if at all) will also change correspondingly. In one embodiment, a device for providing a narrow or non-dispersive beam includes a microlouvered film, receiving light from a light source, such as a light emitting diode (LED). In one embodiment, the adjustment for the lateral position of the image path of the left eye (with respect to the optical device as a whole) is independent from the adjustment for the lateral position of the image path for the right eye (with respect to the optical device as a whole), in the sense that adjusting the left image path lateral position has no effect on the right image path lateral position. In one embodiment, the apparatus and method allows adjustment, preferably independently, of the vertical position of the left and right image paths to achieve vertical alignment. Preferably, a narrow beam system is used for indicating vertical alignment to a user (which may be the same vertical beam used for indicating horizontal alignment or may be a separate narrow beam).

In one aspect, a head-mounted display or other optical device which provides at least a first image to at least one eye of a user can be adjusted for changing the alignment of an image path with respect to a user's eye position. An alignment beam generator is mounted so as to move with the image path device so a user can use characteristics of the alignment beam to achieve a desired alignment of the image path. Preferably, the alignment beam is configured, such as by making it substantially narrow-beam, linear and/or non-dispersive, such that beam is substantially invisible to the user until it is within a preferred alignment range, so as to provide a binary or visible/invisible, indicator of alignment.

DETAILED DESCRIPTION OF THE PREFERRED EMBODIMENT

Figure 1:
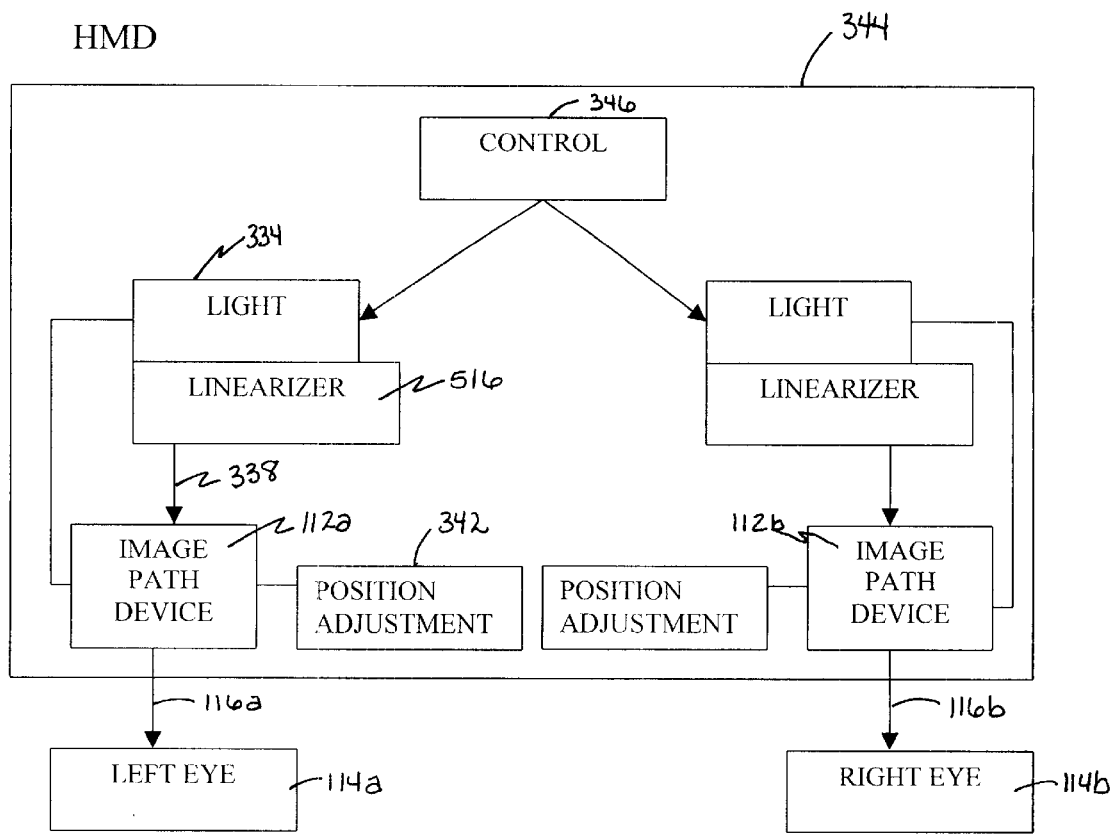
FIG. 1 is a block diagram of an alignment adjustment device according to an embodiment of the present invention.

Although the present invention can be used with any of a plurality of devices which are intended to provide images to the left and right eyes including devices such as binoculars, binocular or bi-ocular microscopes, and the like, the present invention is believed to be particularly useful in connection with an electronic display device such as a helmet-mounted display or a head-mounted display. FIG. 1 depicts, in block diagram fashion, certain components of a head-mounted display according to one embodiment of the present invention.

In the embodiment of FIG. 1, the HMD provides first and second image path devices 112*a* 112*b*. As used herein, an "image path" relates to the path of image light provided by the HMD (or other optical device) as it enters the user's eye, with the image path determining where (and whether) the image light appears in the user's field of vision, and more precisely, the image path relates to the light path of a single point (such as a center point, or other reference point) in the image intended to fall on a predetermined position or relation in a user's field of vision (typically a center point in the field of vision). As used herein, "horizontal" and "vertical" refer to the axis of an image (as perceived by a user) which is (at least approximately), respectively, parallel to and perpendicular to a line joining the centers of the fields of vision of the left and right eyes of the user and is accordingly (at least approximately), respectively, parallel to and perpendicular to a line joining the eye positions of the user.

As will be understood by those of skill in the art, at least after understanding the present disclosure, many devices and configurations can be used for generating images and for providing (one or more) image paths. For example, in some devices, two separate LCD or other image generators are provided for producing left and right images, while in other devices, a single LCD or other image generator is provided and a beam splitter generates left and right and images. For purposes of illustrating an embodiment of the present invention, FIG. 3 includes an illustration one type of a (simplified) image path device. Those of skill in the art will understand how to implement embodiments of the present invention in the context of other optical devices, having other image generator or image path devices, after understanding the present disclosure.

Figure 3:
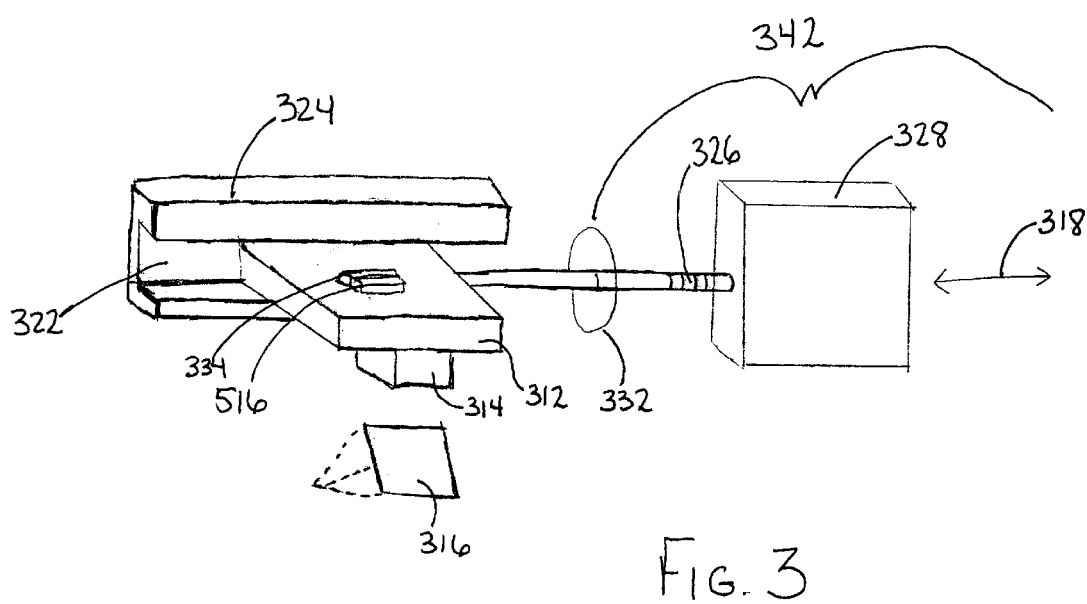
FIG. 3 is a simplified, schematic, perspective view of an alignment mechanism according to an embodiment of the present invention.

In the embodiment of FIG. 3, an LCD device 312, receiving signals from an image source (such as a television receiver, a video tape or DVD player or, a computer video output, a video camera or the like, not shown) provides output, optionally through one or more optics devices such as waveplates, fiberoptic devices, lenses, masks, defractors and the like, to a fold mirror 316, typically inclined about 45° to the axis of the image output by the LCD 312. In one embodiment, the fold mirror 316 reflects the image light directly to an eye 114*a*, 114*b* of a user. In another embodiment, a fold mirror 316 reflects the light to another optic device such as a enlarging reflector or reflective combiner for reflecting the image (possibly through the fold mirror 316) to the eye 114*a*, 114*b* of the user. Examples of image path devices of types that can be used in embodiments of the present invention can be found, e.g., in U.S. Pat. No. 5,991,085, issued Nov. 23, 1999 (incorporated herein by reference). Those of skill in the art will understand how to implement embodiments of the present invention in the context of other types of optical devices, after understanding the present disclosure.

In many optical devices, numerous components may contribute to the generation and position of the image paths 116*ab*. In the depicted embodiment, at least some of the components are of a nature that the position of such components determines the direction or position of the image paths 116*ab*, and thus constitutes some or all of the image path devices 112*ab*. In the embodiment of FIG. 3, the LCD 312 is mounted in a fashion to permit adjustment of the LCD position 312 in a horizontal direction 318. FIG. 3 illustrates one (simplified) fashion for permitting such adjustment and those of skill in the art will understand other ways of adjusting position of an image path device and/or ways of implementing embodiments of the present invention in the context of other adjustment devices and procedures. In the embodiment of FIG. 3, an edge of the LCD 312 (or an LCD carrier) is positioned in a groove 322 of a linear track device or rail 324 in a fashion to permit and guide movement of the LCD 312 in a horizontal direction 318. In the embodiment of FIG. 3, such adjustment is performed by coupling a threaded attachment rod 326 between a fixed, internally threaded block 328, and an edge of the LCD 312. By turning the rod 326, e.g., using a thumb wheel 332, the rod 326 is threaded into, or out of, the fixed block 328, carrying the LCD 312 in a horizontal direction 318, guided by the rail 324. Although FIG. 3 shows a (simplified) example of a devise for adjusting position of a first image path device, as will be understood by those of skill in the art, a similar (e.g., mirror-image) arrangement can be used for adjusting the position of a second image path device.

Figure 2:
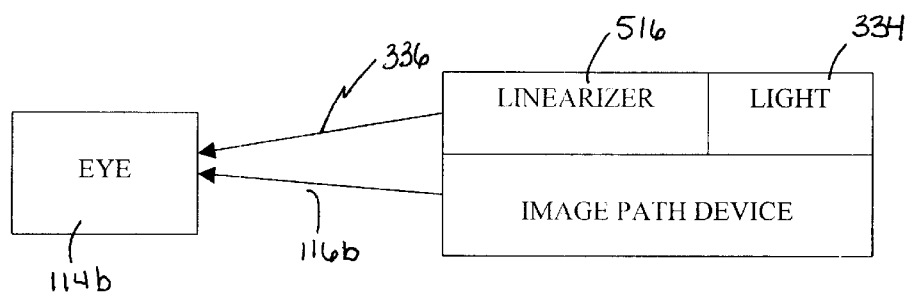
FIG. 2 is a block diagram of an alignment adjustment device according to an embodiment of the present invention.
Figure 4:
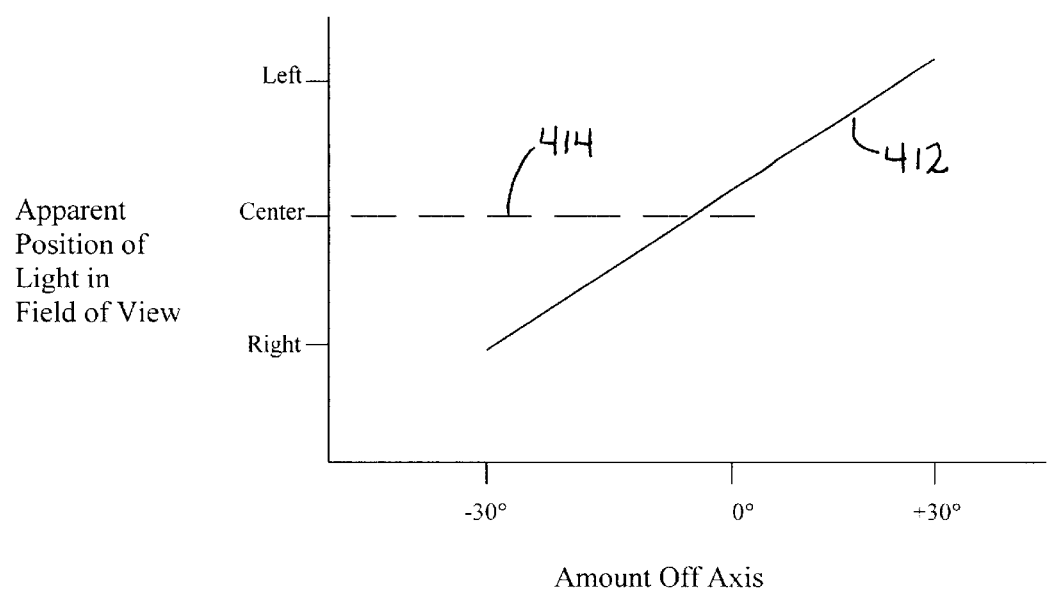
FIG. 4 is a graph depicting the relation of the apparent position of an alignment light, in the field of view, as a function of the amount an image is off-axis, of a type which can be provided according to one embodiment of the invention.

In the absence of providing a user with assistance in achieving desired alignment (e.g., as described below), while the user may be able to change the image position, it would be difficult for a user to known when correct or preferred alignment has been achieved. In the embodiment depicted in FIGS. 1 through 3, an alignment light beam generator 334 is mounted in a fixed position with respect to an image path device 112a, such that the light 334 moves with the image path device 112a as it is adjusted. Although a light emitting diode (LED) is a preferred light source in at least some embodiments, a number of other devices can be used as a light source including incandescent or flourescent lights, ambient light (e.g., using optics to guide an amount of ambient light along a desired path), laser diode devices and the like. In one embodiment, e.g., as seen in FIG. 2, the light 334 provides a beam 338 which can enter the user's eye 114b and provide a user with an indicator for assisting in alignment. The device preferably achieves a substantially binary alignment indication, e.g., such that the light is substantially invisible until substantial alignment is achieved (including as described more thoroughly below). However, it is possible to provide embodiments in which a substantially continuous or nonbinary indication is used. For example, by providing an indicator light beam 336 which is substantially narrow, the beam can indicate relative degree of alignment by appearing at different locations in a user's field of vision. For example, as depicted in FIG. 4, in one configuration, the position of the alignment beam 336 in the user's field of view is substantially directly proportional 412 to the amount of misalignment or the amount of off-axis positioning of the image path 116a. In this embodiment, a user can provide or achieve adjustment by, e.g., adjusting the thumb wheel 332 until the alignment beam 336 appears at or near the center of the 414 user's field of view.

Figure 5A:
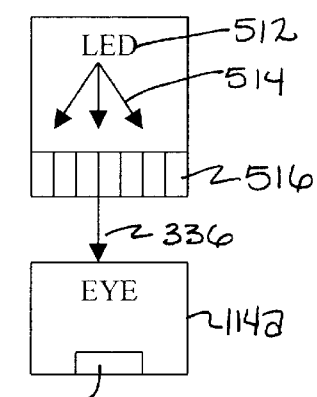
FIGS. 5A and 5B are top plan schematic views of relationships of an alignment verification device in an unaligned system and an aligned system respectively, according to an embodiment of the present invention.
Figure 5B:
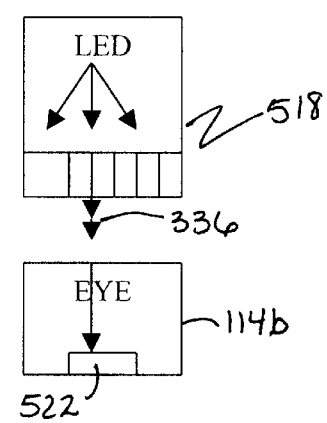

However, it is believed it may be difficult for at least some users to judge, with sufficient accuracy, when a indicator beam is in the center of the user's field of view. Accordingly, in one embodiment, the device is configured such that the alignment beam is substantially invisible unless it is sufficiently aligned. For example, in the embodiment of FIG. 5A, an LED or other light source 512 which outputs a somewhat dispersive (even if narrow) beam 514 is coupled to a linearizer 516. The linearizer functions to provide an alignment beam 336 which is substantially linear and substantially non-dispersive (and preferably substantially narrow). A number of devices can be used as a linearizer 516. In one embodiment, a linearizer 516 is provided by a film which effectively defines a plurality of microscopic parallel louvers. One example of a film of this type, which can be used in embodiments of the present invention, is available from Minnesota Mining and Manufacturing (3M). Without wishing to be bound by any theory, by providing a linearizer 516, a situation can be provided, as depicted in FIGS. 5A and 5B, in which, if the alignment device 518 (which is coupled to, and moves with, the image path device 112a) is not desirably aligned with the eye 114d, even though some amount of light from the alignment beam 336 may enter the eye 114a, the alignment beam 336 will not (substantially) reach the fovea 522 of the eye 114a, or otherwise will be substantially not perceived (or only subliminally perceived) by a user. However, once the alignment device 518 is adjusted to the desired alignment, as depicted in FIG. 5B, the linearized alignment beam 336 will substantially directly reach the fovea 522 and will be perceived by a user.

Figure 6:
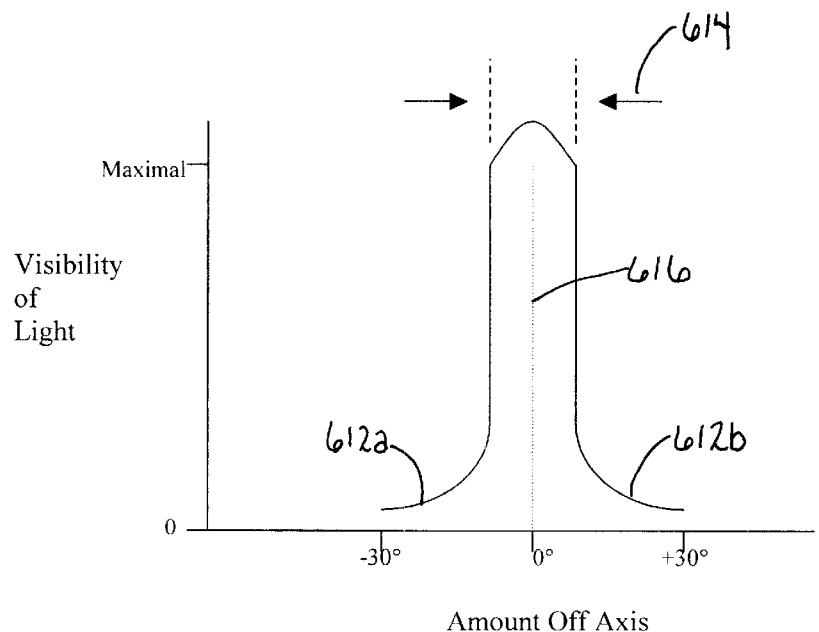
FIG. 6 is a graph of the relationship of visibility (intensity) of an alignment light as a function of the amount an image is off-axis, of a type which can be provided according to one embodiment of the present invention.

As shown in FIG. 6, when the image path device 112a, 112b is substantially unaligned 612a, 612b, the alignment light is substantially invisible (or only minimally visible) to a user. However, once alignment is within at least a predetermined range 614 of ideal alignment (0° off-axis) 616, the light becomes visible to the user. This provides a substantially binary indicator to a user who does not need to judge, e.g., the relative position of an indicator light in his field of view but only needs to note the presence or absence (visibility or invisibility) of the alignment or indicator light.

Figure 7:
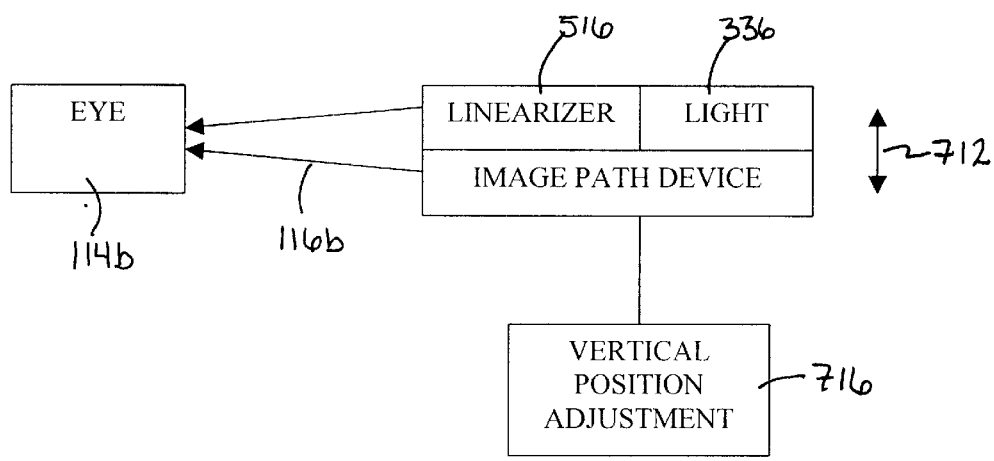
FIG. 7 is a block diagram of a vertical position alignment device according to an embodiment of the present invention.

The configuration depicted in FIGS. 1 through 3 illustrate alignment along a substantially horizontal axis 318. If desired, embodiments of the present invention can be used to provide for alignment along other axes, such as alignment along a vertical axis 712, as depicted in FIG. 7. As one example, a screw-threader rod arrangement (e.g., similar to that depicted in FIG. 3, but vertically aligned) can be used. Those of skill in the art will understand various other devices to provide vertical position adjustment 716 for various types of optical devices after understanding the present disclosure.

Figure 8:
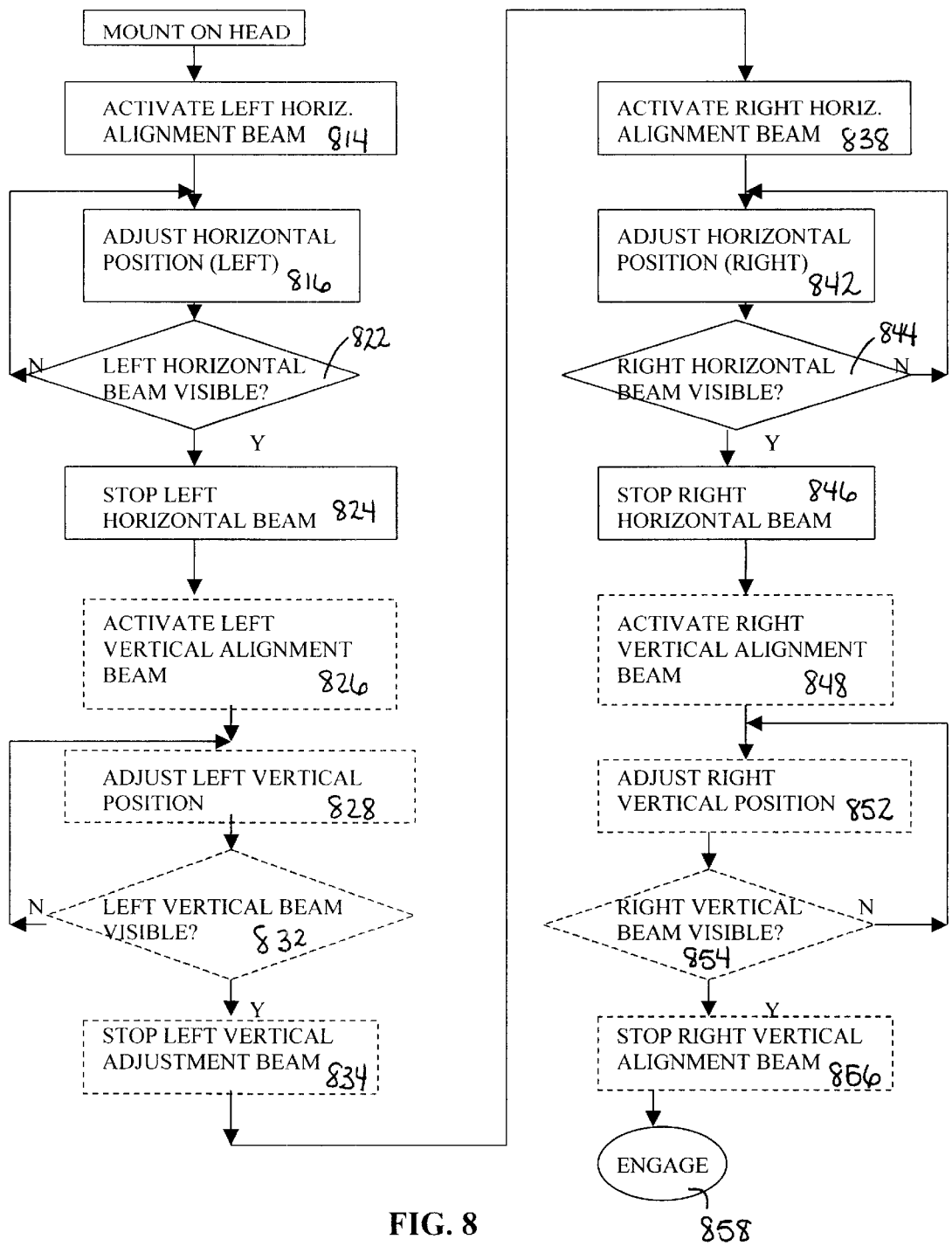
FIG. 8 is a flow chart depicting steps in an alignment method according to one embodiment of the present invention.

In practice, one example of a use of the present invention involves initially mounting an HMD 344 on a user's head 812. After head-mounting, the left horizontal alignment beam is activated 814, e.g., using a control circuit 346. A control circuit 346 can involve substantially manual operation (such as providing a series of buttons for activating various alignment beams) or can be fully or partially automatic (such as initiating an alignment procedure, preferably with visible or audio instructions or signals to a user, upon initial power up). The user then adjusts 816 the horizontal position of the left image path device 112a (e.g., using the thumb wheel 332 in the embodiment of FIG. 3). The user continues the alignment 818 until the left horizontal beam becomes visible 822 (as graphically illustrated in FIG. 6). At this point, the output of the left horizontal beam is stopped 824. In the embodiment depicted in FIG. 8, if the device is also provided with vertical alignment capabilities, a left vertical alignment beam is activated 826, the left vertical position is adjusted 828 until the left vertical beam becomes visible 832 and the left vertical beam is then stopped 834. The right horizontal alignment beam is activated 838 and the right horizontal position is adjusted 842 until the right horizontal beam becomes visible 844 whereupon the right horizontal beam is stopped 846. If right vertical alignment is provided, the right vertical alignment beam 848 is activated, the right vertical position is adjusted 852 until the right vertical alignment beam becomes visible 854 whereupon the right vertical alignment beam is stopped 856, ending the procedure 858. As will be understood by those of skill in the art after understanding the present disclosure, it is possible to use other methods or techniques in achieving desired alignment, including using procedures which have more or fewer steps, or perform steps in an order different from that depicted in FIG. 8.

In light of the above description, a number of advantages of the present invention can be seen. The present invention allows users to enjoy improved image quality and/or avoid eye strain, eye fatigue and the like by achieving alignment of one or more image paths with the user's eyes in a relatively easy and accurate fashion. The present invention can be implemented so as to avoid the need for users to make judgments about the position of an image within a user's field of view. In some embodiments, a substantially binary alignment indication reduces or eliminates the need for substantially subjective alignment judgments. The present invention provides a feasible, relatively easy and relatively inexpensive fashion of achieving image alignment which can, if desired, be used for substantially independent adjustment for left and right eyes and/or substantially independent adjustment along two or more directions (e.g., horizontal and vertical).

A number of variations and modifications of the invention can be used. It is possible to use some features of the invention without using others. For example, it is possible to provide for alignment indicator beams without providing for a substantially binary alignment indication. Although a visibility/invisibility difference has been described as providing a substantially binary alignment indication, other types of binary indications can be used such as signals which appear to change color or spatial or temporal pattern when alignment is achieved and the like. Although embodiments described above which provide alignment of left and right images have included embodiments that provide such left and right alignment independent of one another, other embodiments can be used (in place of or in addition to independent alignment) which include symmetric or otherwise non-independent alignment. Certain indicators of relative alignment with respect to left and right image fields can be provided, such as configurations in which different-colored alignment lights, for left and right images, will both be activated at the same time and will overlap to provide, e.g., a single white image light, when the left and right images have substantially identical alignments in the respective left and right fields of view of the user. Although, in one described embodiment, the device is configured such that an indicator light is invisible when an image is not aligned properly and becomes visible when the image path is properly aligned, it is also possible to provide an opposite approach in which a user perceives an indicator light when the image path is out of alignment and in which the indicator light or lights become invisible to the user once proper alignment has been achieved. Although the present invention can be used in connection with binocular or bi-ocular devices intended to provide images to left and right eyes, some embodiments of the invention can also be of use in connection with devices which provide images to only one eye (and/or which provide position adjustment for only one eye). For example, devices which are mounted on (or in a fixed position with respect to) a user's head but which provide an image to one eye still may benefit from a device which is practical for adjusting the position of that image with respect to a user's eye position. Although the present invention is described as useful in connection with providing separate adjustment of left and right eye positions, preferably (but not necessarily) with both horizontal and vertical adjustment capabilities, it is also possible to use embodiments of the present invention which provide position adjustment with respect to only one eye (even though images may be provided to both eyes), and/or devices which provide vertical and/or horizontal position adjustment of images with respect to both the left and rights eyes but which are not independent (e.g. providing adjustment which is symmetric with respect to a mid-point or other fixed point on a head mounted display) and/or which provide only for adjustment in a horizontal (or other) direction, but not vertical, or vice versa. Although embodiments described herein have included devices that adjust image path by movement in a linear (or translation) fashion, it is also possible to use embodiments of the present invention in the context of devices which provide rotational (angular) adjustment of an image path (either alone or in combination with translation). Although in embodiments described above, an alignment light is configured so as to assist a user in performing a manual position adjustment, it is also possible to provide for a motorized adjustment, e.g., by driving a threaded rod 326 with a small motor or the like. Although alignment is described above in the context of a substantially manual procedure, it is also possible to implement embodiments of the present invention using a device and procedure involving substantially automatic alignment (i.e., substantially without the need for a user to perform an adjustment and/or make an alignment decision). For example, an optical device can be configured to detect the position of an alignment beam in a user's field of vision, e.g., by detecting light reflected from a user's cornea and to use such position information to adjust alignment, e.g., by activating a small motor or the like. Although some embodiments of the present invention have described a alignment beam which is a visible light, it is also possible to provide embodiments in which the alignment beam is substantially invisible, such as a far infrared wavelength light (e.g., for use in an automatic alignment device or procedure). If desired, the light beams used for various different alignments can be configured for distinguishing one from the other such as by providing different alignment beams with different colors, different flashing or other patterns, different apparent shapes and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for alignment in an optical device comprising:

at least a first image path device, moveable among a plurality of positions, and defining an image path which moves, with respect to at least a first eye of a user, as said image path device moves among said plurality of positions;

an alignment light beam generator generating an alignment light beam, said alignment light beam generator coupled to said image path device to move with said device wherein movement of said image path device among said plurality of positions is accompanied by a change in a path of said alignment beam; and wherein any appearance of said alignment beam in a field of vision of said at least one eye of said user while said optical device is in a first configuration, with said image path being within a predetermined range of a preferred alignment of said image path with respect to said eye of said user, is different from any appearance of said alignment beam while said optical device is in a second configuration, with said alignment of said image path being outside said range.

2. Apparatus, as claimed in claim 1, wherein said appearance of said alignment beam while said optical device is in said first configuration is different from an appearance of said alignment beam while said optical device is in said second configuration, by being visible in said first configuration and substantially invisible in said second configuration.

3. Apparatus, as claimed in claim 1 wherein said appearance of said alignment beam while said optical device is in said first configuration is different from an appearance of said alignment beam while said optical device is in said second configuration, by being in a first range of positions in said user's field of view in said first configuration and being outside said range of positions of said user's field of view in said second configuration.

4. Apparatus, as claimed in claim 1 wherein said appearance of said alignment beam while said optical device is in said first configuration is different from an appearance of said alignment beam while said optical device is in said second configuration, by being perceived as a first color in said first configuration and being perceived as a second color in said second configuration.

5. Apparatus, as claimed in claim 1, further comprising a second image path device which provides a second image path to a second eye of said user and a second alignment beam generator coupled to said second image path device.

6. Apparatus, as claimed in claim 5, wherein the position of said second image device with respect to said second eye of said user can be adjusted independently of adjustment of a position of said first image path device with respect to said first eye of said user.

7. Apparatus, as claimed in claim 1, wherein said movement of said image path device includes movement along a substantially horizontal axis.

8. Apparatus, as claimed in claim 1, wherein said movement of said image path device includes movement along a substantially vertical axis.

9. Apparatus, as claimed in claim 1, further comprising a linearizer which linearizes said alignment beam to provide a substantially non-dispersive beam.

10. Apparatus, as claimed in claim 1, wherein said optical device is a head-mounted display device.

11. Apparatus, as claimed in claim 1, further comprising linearizing said alignment beam to provide a substantially non-dispersive beam.

12. A method for alignment in an optical device, said optical device having at least a first image path device, moveable among a plurality of positions, and defining an image path which moves, with respect to at least a first eye of a user, as said image path device moves among said plurality of positions comprising:

coupling an alignment light beam generator, to said image path device to move with said image path device, wherein movement of said image path device among said plurality of positions is accompanied by a change in a path of said alignment beam;

moving said first image path device to change a mis-alignment appearance of said alignment beam, said mis-alignment appearance occurring while said optical device is in a misalignment configuration, with said alignment of said image path being outside said range appearance of said alignment beam in a field of vision of said at least one eye of said user, to an alignment appearance, said alignment appearance occurring while said optical device is in an alignment configuration, with said image path being within a predetermined range of a preferred alignment of said image path with respect to said eye of said user, said alignment appearance being different from said mis-alignment appearance.

13. A method, as claimed in claim 12, wherein said alignment appearance of said alignment beam is different from said mis-alignment appearance of said alignment beam, in that said alignment beam is visible to the user, using said first eye, during said alignment appearance and is substantially invisible to said user, using said first eye, during said mis-alignment appearance.

14. A method, as claimed in claim 12 wherein said alignment appearance of said alignment beam is different from said mis-alignment appearance of said alignment beam, in that said alignment beam appears as a first color to the user, using said first eye, during said alignment appearance and appears as a second, different, color to said user, using said first eye, during said mis-alignment appearance.

15. A method, as claimed in claim 12 wherein said appearance of said alignment beam while said optical device is in said first configuration is different from an appearance of said alignment beam while said optical device is in said second configuration, by being perceived as a first color in said first configuration and being perceived as a second color in said second configuration.

16. A method, as claimed in claim 12, wherein said optical device further includes a second image path device for providing a second image path to a second eye of said user and further comprising the step of:

coupling a second alignment beam generator to said second image path device.

17. A method, as claimed in claim 16, further comprising adjusting a position of said second image device with respect to said second eye of said user independently of any adjustment of a position of said first image path device with respect to said first eye of said user.

18. A method, as claimed in claim 12, wherein said step of moving said first image path device includes moving along a substantially horizontal axis.

19. A method, as claimed in claim 12, wherein said step of moving said first image path device includes moving along a substantially vertical axis.

20. Apparatus for alignment in an optical device comprising:

at least a first image path means, moveable among a plurality of positions, for defining an image path which moves, with respect to at least a first eye of a user, as said image path means moves among said plurality of positions;

an alignment light beam means for generating an alignment light beam, said alignment light beam means coupled to said image path means to move with said image path means wherein movement of said image path means among said plurality of positions is accompanied by a change in a path of said alignment beam; and wherein any appearance of said alignment beam in a field of vision of said at least one eye of said user while said optical device is in a first configuration, with said image path being within a predetermined range of a preferred alignment of said image path with respect to said eye of said user, is different from any appearance of said alignment beam while said optical device is in a second configuration, with said alignment of said image path being outside said range.

21. Apparatus, as claimed in claim 20, wherein said appearance of said alignment beam while said optical device is in said first configuration is different from an appearance of said alignment beam while said optical device is in said second configuration, by being visible in said first configuration and substantially invisible in said second configuration.

22. Apparatus, as claimed in claim 20 wherein said appearance of said alignment beam while said optical device is in said first configuration is different from an appearance of said alignment beam while said optical device is in said second configuration, by being in a first range of positions in said user's field of view in said first configuration and being outside said range of positions of said user's field of view in said second configuration.

23. Apparatus, as claimed in claim 20 wherein said appearance of said alignment beam while said optical device is in said first configuration is different from an appearance of said alignment beam while said optical device is in said second configuration, by being perceived as a first color in said first configuration and being perceived as a second color in said second configuration.

24. Apparatus, as claimed in claim 20, further comprising a second image path means for providing a second image path to a second eye of said user and a second alignment beam generator means coupled to said second image path means.

25. Apparatus, as claimed in claim 24, further comprising means for adjusting the position of said second image path means, with respect to said second eye of said user, independently of any adjustment of a position of said first image path means with respect to said first eye of said user.

26. Apparatus, as claimed in claim 20, wherein said movement of said image path means includes movement along a substantially horizontal axis.

27. Apparatus, as claimed in claim 20, wherein said movement of said image path device includes movement along a substantially vertical axis.

28. Apparatus, as claimed in claim 20, further comprising means for linearizing said alignment beam to provide a substantially non-dispersive beam.

* * * * *